(12) United States Patent
Jabara (10) Patent No.: US 10,798,572 B2
(45) Date of Patent: Oct. 6, 2020

(54) SYSTEM AND METHOD FOR SECURE APPLIANCE OPERATION

(71) Applicant: ioXt, LLC, Newport Beach, CA (US)

(72) Inventor: Gary Bernard Jabara, Newport Beach, CA (US)

(73) Assignee: ioXt, LLC, Newport Beach, CA (US)

( * ) Notice: Subject to any disclaimer, the term of this patent is extended or adjusted under 35 U.S.C. 154(b) by 0 days.

(21) Appl. No.: 16/664,380

(22) Filed: Oct. 25, 2019

(65) Prior Publication Data

US 2020/0137569 A1   Apr. 30, 2020

Related U.S. Application Data

(60) Provisional application No. 62/750,704, filed on Oct. 25, 2018.

(51) Int. Cl.
| | |
|---|---|
| *H04W 12/06* | (2009.01) |
| *H04W 12/00* | (2009.01) |
| *H04N 21/432* | (2011.01) |
| *H04L 9/06* | (2006.01) |
| *H04N 21/439* | (2011.01) |

(52) U.S. Cl.
CPC ........... *H04W 12/06* (2013.01); *H04L 9/0637* (2013.01); *H04N 21/432* (2013.01);
(Continued)

(58) Field of Classification Search
CPC ..... H04W 12/06; H04W 12/00; H04W 12/08; H04W 12/00524; H04W 4/33;
(Continued)

(56) References Cited

U.S. PATENT DOCUMENTS

| | | | |
|---|---|---|---|
| 7,656,889 B2 * | 2/2010 | Jeon et al. ..................... | 370/428 |
| 9,001,837 B2 * | 4/2015 | Lam et al. .......... | H04L 12/2834 |

(Continued)

FOREIGN PATENT DOCUMENTS

| | | | | |
|---|---|---|---|---|
| EP | 3 579 494 A1 * | 6/2018 | .............. | H04W 4/24 |
| WO | 2015/065539 A2 | 5/2015 | | |

(Continued)

OTHER PUBLICATIONS

Extended European Search Report dated Jul. 19, 2019, issued in corresponding European Patent Application No. 19168022.2, filed Apr. 9, 2019, 9 pages.

(Continued)

*Primary Examiner* — Meless N Zewdu
(74) *Attorney, Agent, or Firm* — Davis Wright Tremaine LLP; Michael J. Donohue (57) ABSTRACT

Secure control of network appliances uses a 5G compatible central hub connected to a plurality of network appliances or multiple hubs in a local area network (LAN) or wireless LAN. A master hub controls communication with the appliances and also includes a 5G cellular link for communication with a cellular network. Only the master hub can communicate with the Internet via the cellular link. User equipment (UE) contains an application program that works in conjunction with the central hub to control the appliances. Upon receipt of an authenticated command, the central hub propagates commands to the intended network appliance. The central hub includes a voice command module to permit a user to control operation of the network appliances using voice commands.

24 Claims, 7 Drawing Sheets

(52) U.S. Cl.
CPC ........ *H04N 21/439* (2013.01); *H04W 12/001* (2019.01); *H04W 12/00305* (2019.01); *H04W 12/00524* (2019.01)

(58) Field of Classification Search
CPC ......... H04W 12/001; H04W 12/00305; H04W 4/14; H04W 16/00; H04W 16/18; H04W 16/20; H04W 16/22; H04W 16/225; H04W 4/80; H04W 88/02; H04W 88/08; H04W 80/00; H04W 80/12; H04W 4/30; H04W 12/002; H04W 12/009; H04W 12/00503; H04W 12/00409; H04W 12/0403; H04W 88/16; H04W 88/18; H04W 4/00; H04L 9/06; H04L 9/0637; H04L 12/2807; H04L 12/281; H04L 12/2814; H04L 12/2816; H04L 12/2821; H04L 12/2823; H04L 12/2803; H04L 12/2805; H04L 12/2809; H04L 12/2812; H04L 12/282; H04L 12/2825; H04L 12/2827; H04L 12/2829; H04L 12/283; H04L 12/2834; H04L 12/2838; H04L 12/2836; H04N 21/43637; H04N 21/439; H04N 21/432; H04N 1/00403; H04N 21/4131; H04N 21/4126; H04N 21/414; H04B 10/114; H04B 10/1143; H04B 10/1149
See application file for complete search history.

(56) References Cited

U.S. PATENT DOCUMENTS

| | | | | |
|---|---|---|---|---|
| 2014/0159877 | A1* | 6/2014 | Huang | G08C 17/02 |
| 2014/0362183 | A1* | 12/2014 | Benyola | H04N 13/0022 |
| 2014/0366050 | A1* | 12/2014 | Hatambeiki et al. | H04N 21/44204 |
| 2015/0019736 | A1* | 1/2015 | Imes et al. | 709/226 |
| 2015/0195100 | A1* | 7/2015 | Imes et al. | H04L 12/2807 |
| 2016/0323156 | A1 | 11/2016 | Zakaria | |
| 2017/0005390 | A1 | 1/2017 | Zakaria | |
| 2017/0006595 | A1 | 1/2017 | Zakaria | |
| 2018/0014241 | A1 | 1/2018 | Perdomo | |
| 2018/0131571 | A1* | 5/2018 | Ansari et al. | H04L 41/12 |
| 2018/0227627 | A1* | 8/2018 | Jabara et al. | H04N 21/43637 |
| 2018/0278347 | A1 | 9/2018 | Bhattad | |
| 2019/0020493 | A1* | 1/2019 | Arling et al. | H04L 12/282 |
| 2019/0268177 | A1* | 8/2019 | Li | H04L 12/2834 |
| 2019/0306232 | A1 | 10/2019 | Brock | |
| 2020/0204539 | A1 | 6/2020 | Robison | |

FOREIGN PATENT DOCUMENTS

| | | |
|---|---|---|
| WO | 2016/100200 A1 | 6/2016 |
| WO | 2017/120243 A1 | 7/2017 |

OTHER PUBLICATIONS

Korean Preliminary Rejection dated Nov. 29, 2019, issued in corresponding Korean Patent Application No. 10-2019-0041209, filed Apr. 9, 2019, 4 pages.

Singh, M., et al. "Blockchain: A Game Changer for Securing IoT Data," Proceedings of the 2018 IEEE 4th World Forum on Internet of Things (WF-IoT), Singapore, Singapore, Feb. 5-8, 2018, pp. 51-55.

Decision of Patent Grant dated May 29, 2020, issued in corresponding Application No. KR 10-2019-0041209, filed Apr. 9, 2019.

* cited by examiner

| DEVICE TYPE | DEVICE NAME | IP ADDRESS | MAC ADDRESS | DEVICE ID | PRIVATE KEY | PUBLIC KEY | DEVICE FEEATURE |
|---|---|---|---|---|---|---|---|
| TV | SAMSUNG | 192.168.1.1 | 231.222.222.11 | HOME_1_TV_1 | XXXX.XXX.XX | PUBLIC_KEY_1 | ON-OFF-CHANNEL SWITCH |

SMARTHUB BLOCKCHAIN DB

SYSTEM AND METHOD FOR SECURE APPLIANCE OPERATION

BACKGROUND OF THE INVENTION

Field of the Invention

The present disclosure relates generally to telecommunications and, more specifically, to a system and method for secure operation with network-connected devices.

Description of the Related Art

Connected devices have evolved in the range of capability and complexity. Early sensors involved a simple function, such as reading a gas meter or electric meter and reporting the data back to a utility company via the Internet. However, a broad range of devices are now available for a "smart home" or office that may include safety sensors (e.g., gas detectors, smoke detectors, and the like), security devices (e.g.; intrusion detection, motion sensors, security cameras, and the like), environmental controls (e.g., heating/cooling controls, ventilation, and the like) and operational status monitors (e.g., monitors in refrigerators, washer/dryer, and the like). The broad range of Internet connected devices are sometimes referred to as the "Internet of Things" (IoT) devices or appliances. In this context, the term "appliance" refers broadly to network-connected devices and not merely to home appliances, such as washers, dryers, refrigerators, and the like.

When one considers the complexity involved in a smart home or offices that are fully connected with a range of different IoT based sensors from different companies, it can be appreciated how difficult it is to manage security, integration, and payment issues associated with the devices. Each device typically has its own controller. In addition, most existing smart home solutions are based on unlicensed networks, which provide minimum control and security. Some devices provide no security at all. The unlicensed network implementation makes a system more vulnerable to hacking.

A number of attacks involving corrupted IoT devices. For example, IoTroop leveraged a number of known security vulnerabilities to infect over 9 million IoT devices. In another example, Mirai malware caused a sustained distributed denial of service (DDoS) attack from more than 175,000 IoT devices. A DDoS attack on Liberia nearly knocked out the country's entire Internet. In yet another example, a random denial of service (RDoS) attack in South Korea involved seven banks by exploiting IoT devices. Thus, the threat of network attacks using IoT devices is very real.

The vulnerability to a security breach is so high that many security checks are required to make a smart home concept a reality. For example, a smart home may have dozens of IoT devices that each transfer sensitive data over the Internet. Such an implementation becomes a significant security threat if not properly secured. In addition, if a single node on a home network is compromised, it puts the entire network at risk. Furthermore, different security protocols on different devices makes it more difficult to provide a trusted network. From a consumer perspective, privacy is a significant concern when several IoT devices may be communicating using personal information of the customer. Therefore, it can be appreciated that there is a significant need for a centralized communication system that will integrate IoT devices making networks more secure and convenient for end users. The present disclosure provides this, and other advantages, as will be apparent from the following detailed description and accompanying figures.

DETAILED DESCRIPTION OF THE INVENTION

The techniques described herein provide a fully integrated Plug-and-Play based secured solution using both licensed and unlicensed wireless networks. With the introduction of fixed 5G wireless networks, bandwidth will exceed the current bandwidth capabilities of existing wireline Internet bandwidth thus making unlimited data faster and more affordable. As will be described in greater detail herein, encryption technology, such as Blockchain technology, can also be used to provide additional security. The Blockchain contains an inherent ability to cope with external attacks by using complex encryption of transaction ledgers contained within the block. In addition, Blockchain technology uses decentralized rather than centralized data storage, which has the advantage of making it more secure and more difficult for hackers to penetrate. These approaches minimize the potential of attacks on network-connected appliances. Appliances in the prior art are typically referred to as IoT devices because of their Internet connectivity. However, as will described in greater detail below, the appliances implemented in accordance with the present disclosure are not able to communicate directly with the Internet and, thus, are not IoT devices. Instead, the appliances described herein may be referred to as network-connected appliances because they are connected on a secure network. As used herein, the term "appliance" refers broadly to network-connected devices and not merely to home appliances, such as washers, dryers, refrigerators, and the like.

In addition, the techniques described herein use public/private key encryption for each appliance as part of the Blockchain to provide additional appliance security as well as providing a technique to securely communicate with each appliance. As a certificate provider, certification of appliances provides an opportunity to monetize systems on a per-hub or per-appliance basis.

The present disclosure will provide examples of implementations of the secure network appliance system of the present disclosure. However, those skilled in the art will appreciate that the principles of the present disclosure are applicable in a smart home for lighting and environmental control, thus providing efficient utilization of energy resources based on user and environmental behavior, home security and monitoring with remote security and monitoring by utilizing smart sensors and cameras, pet care and tracking through the use of smart sensors thereby ensuring quality of care, smart grocery shopping and delivery, by utilizing smart sensors to automatically detect grocery requirements and order placements for on-time delivery, and elder care through the use of smart sensors and vital sign detectors to remotely monitor the elderly and provide on-time medical response in the event of an emergency.

In an enterprise environment, the system of the present disclosure may provide predictive maintenance thereby lowering operating capital costs by facilitating proactive servicing and repair of assets, such as vehicles, office equipment, and the like. In addition, the system can provide supply chain management with smart tracking of end-to-end supply chain cycle from manufacturing to delivery, asset verification and optimization with the use of sensor-embedded equipment to control utilization, verification, and process automated workflows. Fleet management may be provided using smart sensors and trackers to achieve operational efficiency and retail beacons, such as RFID enabled sensors to understand consumer behavior and provide intelligent marketing.

The system provides advantages for municipalities, such as smart metering with the use of autonomous metering of utilities, such as gas, electricity, and water, smart grid operation by providing efficient energy management and load balancing, water and waste management operations by efficiently managing water resources and recycling of waste for improved sustainability through the use of smart sensors. In addition, the system can provide smart transit planning through the use of automated traffic management utilizing real-time data provided by sensors. In addition, the system provides safety and security by monitoring potential threats through utilization of security cameras and automatic alerting of response teams in the case of safety hazards, fires, and the like.

In a manufacturing setting, the system enables smart manufacturing operations by providing smart control of manufacturing process/assembly line through the use of remote monitoring and timely adjustment of assembly line processes. The system provides for smart field services and connected workers by providing smart tracking in monitoring of operational teams for improved efficiency. Preventive maintenance may be provided through the use of remote sensors to thereby lower operating and capital costs by facilitating proactive servicing and repair of assets, such as vehicles, industrial equipment, and the like. The system provides for smart environment solutions through the use of automated environmental (e.g., heat/energy/water) controls to enable efficient use of resources. The system also provides for a digital supply chain with smart tracking of end-to-end supply chain cycle from manufacturing to delivery.

Figure 1:
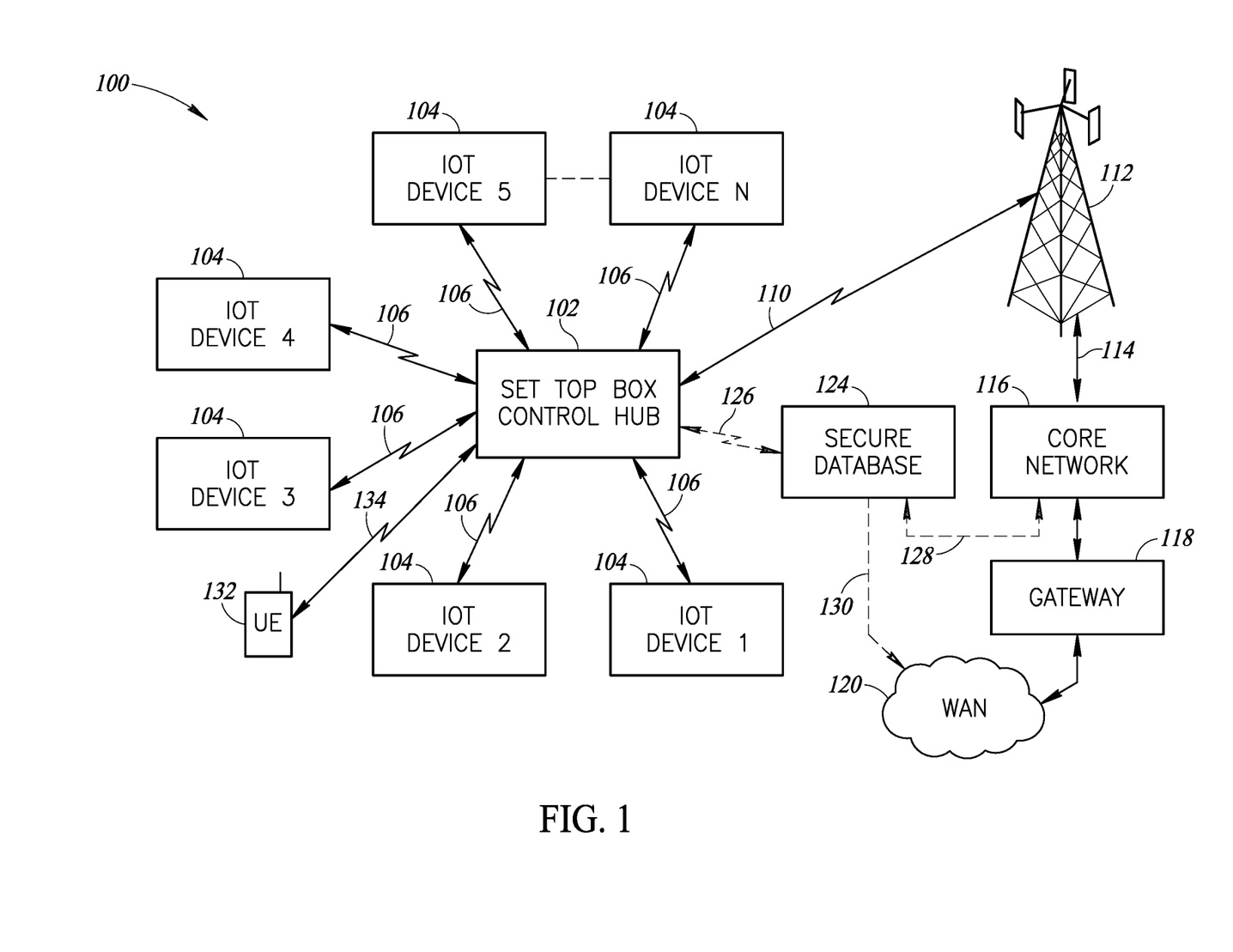
FIG. 1 illustrates an example of a system architecture to implement the system of the present disclosure.

The techniques described herein are illustrated, in an exemplary embodiment, in the system diagram of FIG. 1 where a system 100 includes a secure hub 102. In an exemplary embodiment, the hub 102 is implemented as a set top control box. This implementation permits the efficient integration of cable or wireless video and Internet delivery in addition to the security system. In addition, as will be discussed in detail below, the hub 102 can respond to voice commands for both television and other device operations. A plurality of network-connected appliances 1-N 104 are wirelessly connected to the hub 102 via a respective wireless communication links 106. Details of the wireless communication links 106 are provided below. Those skilled in the art will appreciate that the system 100 can also include appliances 104 that are hard-wired to the hub 102 using, by way of example, an Ethernet connection. The system is not limited by the specific form of communication link between the appliances 104 and the hub 102.

In addition to the wireless communication links 106, the hub 102 includes a cellular communication link 110 to one or more base stations 112. As those skilled in the art will appreciate, a cellular communication link can be established with multiple base stations. For the sake of clarity, FIG. 1 illustrates only a single base station 112. Those skilled in the art will further appreciate that the base station 112 is representative of a cellular system operated by one of the many different cellular network operators. As will be described in greater detail herein, the hub 102 is readily configured for communication using 5G network technology. The 5G network offers very high bandwidth and reliability that will permit the satisfactory implementation of the system 100.

FIG. 1 illustrates a backhaul connection 114 between the base station 112 and a core network 116 operated by the cellular network operator. As noted above, the hub 102 may be implemented as a set top box. In this embodiment, the core network 116 may be owned and/or operated by a cellular network operator, a cable service provider, or a single integrated service provider. With 5G communication technology, a single integrated service provider can offer both cellular service and content programming, such as movies. While content programming may be provided to the set top box via a conventional cable network connection, the high bandwidth provided by 5G permits a wireless connection between the hub 102 and the core network 116 via the 5G wireless communication link 110.

Operation of the base station 112 and core network 116 are implemented in accordance with 5G standards. In certain circumstances, it may be desirable for the hub 102 to communicate with a wide area network (WAN) 120, such as the Internet. To permit access to the WAN 120, the core network 116 typically includes a gateway 118 to facilitate such communications. All communications from the hub 102 to the WAN 120 are pre-encrypted in the hub using, by way of example, pre-internet encryption (PIE) so that any data sniffers will only intercept encrypted data.

As will be described in greater detail below, communication control is accomplished through a unique device-to-device communication protocol referred to herein as ioXt protocol, to provide a secure communication links.

The system 100 also includes a secure database 124 to store encrypted data relating to the network appliances 104, the secure hub 102, and the overall system architecture. As will be discussed in greater detail below, the secure database 124 may be implemented in a variety of different configurations. The dashed lines connecting to the secure database 124 in FIG. 1 illustrate the different alternative configurations. For example, in a home configuration, the end user may wish to have the secure database 124 be locally present within the home. In this implementation, a direct communication link 126 is provided between the hub 102 and the secure database 124. In another implementation, the secure database 124 may be controlled and operated by the cellular network operator. In this implementation, the secure database 124 may be coupled to the core network 116 via a communication link 128. In yet another implementation, the secure database 124 may be accessed via the WAN 120. This may be particularly desirable for a distributed version of the secure database or a Cloud-based implementation. In this embodiment, the secure database 124 is coupled to the WAN 120 via a communication link 130.

As will be described in detail below, in an exemplary embodiment of the system 100, the secure database 124 may be configured as a Blockchain, which may be part of a cloud computing network. In one embodiment, portions of the secure database may be integral with the hub 102 or accessible by the hub and contain information for local network appliances 104 controlled by the hub. The secure database 124 may contain information for each user, including the list of hubs 102, network appliances 104, and user information. Those skilled in the art will appreciate that the secure database 124 may contain information for multiple users and may authorize users to access only a portion of the network appliances 104 connected to a particular hub. For example, in a home environment, the system 100 can be configured to allow all users to control certain elements, such as lights, but restricts certain users (e.g., children) from accessing other network appliances, such as environmental controls, security device operation, security settings, and the like. Thus, the secure database can include not only information about the hub 102 and the network appliances 104, but also includes information about users, including the identification of which secure hubs 102 may be accessible to users and which network appliances 104 may be accessible to users.

A copy of the portion of the secure database 124 for a particular user (e.g., the home environment described above) may be further stored as a block in the Blockchain database. The Blockchain database may contain data entries for all network connected appliances 104, not only in a particular home, but in all homes, enterprise implementations, and other implementations of the system 100 operating in accordance with the ioXt protocol. Security features in the Blockchain, such as encryption, prevent one user from accessing the data for another user. Although the system 100 is described using Blockchain to implement the secure database 124, those skilled in the art can appreciate that other forms of security may be used to implement the secure database. For example, different forms of data encryption may be used to implement the secure database 124.

Finally, FIG. 1 illustrates a user equipment (UE) 132 that communicates with the hub 102 via a wireless communication link 134. In an exemplary embodiment the communication link 134 is implemented as a secure short-range network link, such as provided by IEEE 802.11 (sometimes referred to as WiFi). The UE 132 works with the hub 102 to provide a secure connection to all of the network appliances 104 when the UE is in communication with the hub. As will be described in greater detail below, this control is accomplished through the use of the ioXt protocol, to provide a secure link and operation equivalent to a Blockchain implementation in an "intranet" environment. As will be described in greater detail below, the intranet will allow the hub 102 to communicate with the various network appliances 104. In this network, data can be securely shared between the hub 102 and all the appliances 104 connected thereto.

The UE 132 may also control the system 100 from a remote location. For example, a homeowner may be on vacation, but can still access and control the system 100. In this embodiment, the UE 132 communicates with the hub 102 via the cellular communication link 110. The UE 132 can access the WAN 120 and communicate with the cellular network operator via the gateway 118 and the core network 116. Alternatively, the UE 132 may communicate directly with the cellular network operator via the base station 112 or other base station (not shown) that is part of the cellular network. In this embodiment, the UE 132 communicates with the hub 102 via the cellular communication link 110.

The UE 132 can also access the core network 116 using a cellular communication link (not shown) and the backhaul 114.

Data from the UE 132 is transmitted from the base station 112 to the hub 102 via the cellular communication link 110. In turn, the hub 102 acts upon commands initiated by the UE 132. In response to certain commands, the hub 102 may receive sensor data from one or more of the network appliances 104 and provide the information to the UE 132 via the base station 112 in the reverse order described above. For example, the UE 132 may send a command to check on the temperature within a home. Upon receipt of the command, the hub 102 communicates with a particular one of the network appliances 104 to receive sensor data indicating the environmental temperature. That data may be passed along to the UE 132 in the manner described above. Furthermore, the UE 132 may alter the temperature in the home using a different command. In this circumstance, the command is relayed to the hub 102 via the WAN 120 and the cellular network operator to be transmitted to the hub 102 using the cellular communication link 110. In response to the command, the hub 102 generates commands to the particular network appliance 104 to alter the environmental temperature accordingly.

A software application program executing on the hub 102 and the UE 132 permits a user to read data from a network appliance 104 (e.g., read the temperature from a temperature sensing network appliance 104) and/or control a network appliance (e.g., turn up the temperature). Appliances may be controlled directly from the hub 102 or from the UE 132 communicating with the hub.

All communications between the hub 102 and the network appliances 104 can be encrypted using Hyper Text Transfer Protocol Secure (HTTPS). In addition, the hub 102 generates an encrypted Secure Socket Layer (SSL) certificate for each appliance to provide a security layer, Only a network appliance 104 with the proper SSL certificate can decrypt a command from the hub 102. Part of the HTTPS data includes an address identifying the intended destination network appliance 104. Each network appliance has an address and will only decrypt commands from the hub 102 that are intended for that particular network appliance.

Figure 6:
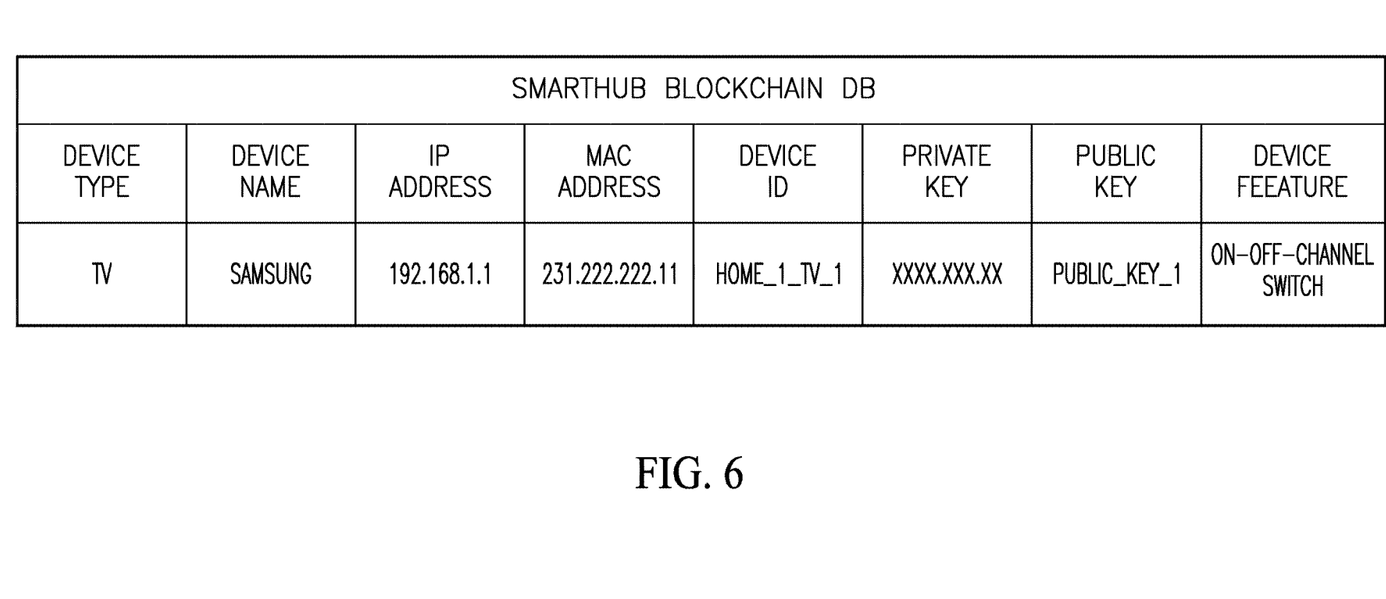
FIG. 6 illustrates a sample data entry of a network appliance in a secured data base in accordance with the present disclosure.

An example of the data entry in the secure database 124 (see FIG. 1) for a television set is illustrated in FIG. 6. The database entry includes a device identification including a device type and name as well as an IP address, MAC address, and a device ID data entry. In addition, the database may store a private key and public key for encryption purposes. Finally, the database may include controllable features of the device, such as on-off, channel selection, volume control, and the like. As discussed above, the IP address and/or MAC address may be used to uniquely identify the device and command data transmitted by the hub 102.

Prior art IoT devices are typically couple to the Internet directly or via a WiFi router and are thus vulnerable to an attack from the Internet. In contrast, the hub 102 effectively serves as a proxy to protect network appliances 104 from an Internet hack. In an exemplary embodiment, the only communication link between the system 100 and the WAN 102 is via the 5G wireless communication link 110. The network appliances 104 cannot be accessed by an external device, thus providing a secure form of operation. As noted above, even the UE 132 cannot directly communicate with the network appliances 104. The UE 132 can access and control the system 100 by communicating with the secure hub 102. The UE 132 can use the short-range communication link 134

(see FIG. 1) to communicate directly with the hub 102. Alternatively, the UE 132 can communicate with the hub 102 via the base station 112 by communicating with the cellular network directly via a cellular communication link (not shown) or by accessing the cellular network using the WAN 120.

In an exemplary embodiment, the hub 102 contains at least a portion of the secure database 124 (see FIG. 1) for all of the network appliances 104 in a particular environment, such as a home. Key information for the appliances is stored in the hub 102 and is encrypted using, by way of example, AES-256 encryption. Other forms of encryption may also be satisfactorily employed to protect the data in the portion of the secure database 124 that is stored in the hub 102. The hub 102 authenticates and verifies each user before granting access to the network appliances 104. Only the hub 102 and the software application executing on the UE 132 can decrypt any data contained within the secure database 124 in the hub. The software application in the UE 132 can receive an encrypted list of appliances 104 from the hub 102. With a Blockchain implementation, the secured database 124 may be partially implemented within the hub 102. The portion of the secure database 124 within the hub 102 contains the encrypted data for all devices controlled by the hub. In addition, a copy of that portion of the secure database is encrypted as a block in a Blockchain database that contains encrypted data for all hubs in various locations.

In addition, cellular communication with the base station 112 is only possible via the hub 102. The hub 102 also provides the only access to the WAN 120 via the gateway 118, as described above. In an exemplary embodiment, the network appliances 104 communicate with the hub 102 using a short-range communication protocol, such as IEEE 802.11, often referred to as WiFi. Other forms of short-range communication, such as Bluetooth, ZigBee, Z-Wave communication, and the like may also be used to form the wireless communication links 106 (see FIG. 1) between the hub 102 and the network appliances 104.

Although the system 100 of FIG. 1 only illustrates a single UE 132, the system may be configured to operate with a plurality of UEs 132. The various users can be spouses, roommates, family members, etc. in a home environment and employees, supervisors, administrators, or the like, that are authorized to access the system 100 using their respective UEs 132 in an enterprise environment.

In a home environment only a single hub 102 may be needed to provide communication coverage to effectively permit communication between the hub 102 and all the ioXt appliances 104. In large building or an enterprise environment, it may be necessary to have a plurality of smart hubs 102. In one embodiment, the UE 132 may communicate with any hub 102 within communication range. The multiple hubs 102 can communicate with each other using a local area network (LAN) or a wireless LAN (WLAN). In an exemplary embodiment, the secure hubs 102 may use 5G cellular communication links to communicate with each other. The various encryption and protection techniques discussed herein (e.g., WPA 2, WPA 3, HTTPS, and the like) are used to protect communications between the multiple hubs 102.

In one embodiment, the hub 102 within communication range of the UE 132 may respond to commands from the UE 132, such as reading sensor data or performing an action. In this implementation, each hub 102 contains a database of connected users and connected network appliances 104. In a manner similar to that described above with respect to FIG. 1, the hubs 102 act on commands from the UE 132 to any network appliances 104 within range of the particular hub.

In an exemplary embodiment, one of the plurality of hubs 102 is designated as a "master hub." Only the master hub 102 includes the cellular connection 110 to the base station 112. Thus, communications with any outside sources is permitted only via the master hub 102.

In another exemplary embodiment, only the master hub 102 may issue commands. In this embodiment, the UE 132 can communicate directly with the master hub 102 if it is within range of the master hub. If the UE 132 is within range of a different hub 102 (i.e., not the master hub), the hub receiving the command will pass the command along in the LAMA/LAN until it is received by the master hub. In this embodiment, only the master hub 102 may contain the portion of the secure database 124 (see FIG. 1) for connected users and appliances within the particular facility. As discussed above, the secure database 124 may be encrypted using AES-256 encryption or other suitable form of encryption. When the master hub 102 receives a command from the UE 132 (either directly or via LAN/WLAN), the master hub generates the command and propagates the command to other nearby hubs. The hubs 102 within communication range of the intended network appliance 104 receive the command. That hub 102 will transmit the command to the network appliance 104, which will decrypt and execute the command.

Figure 2:
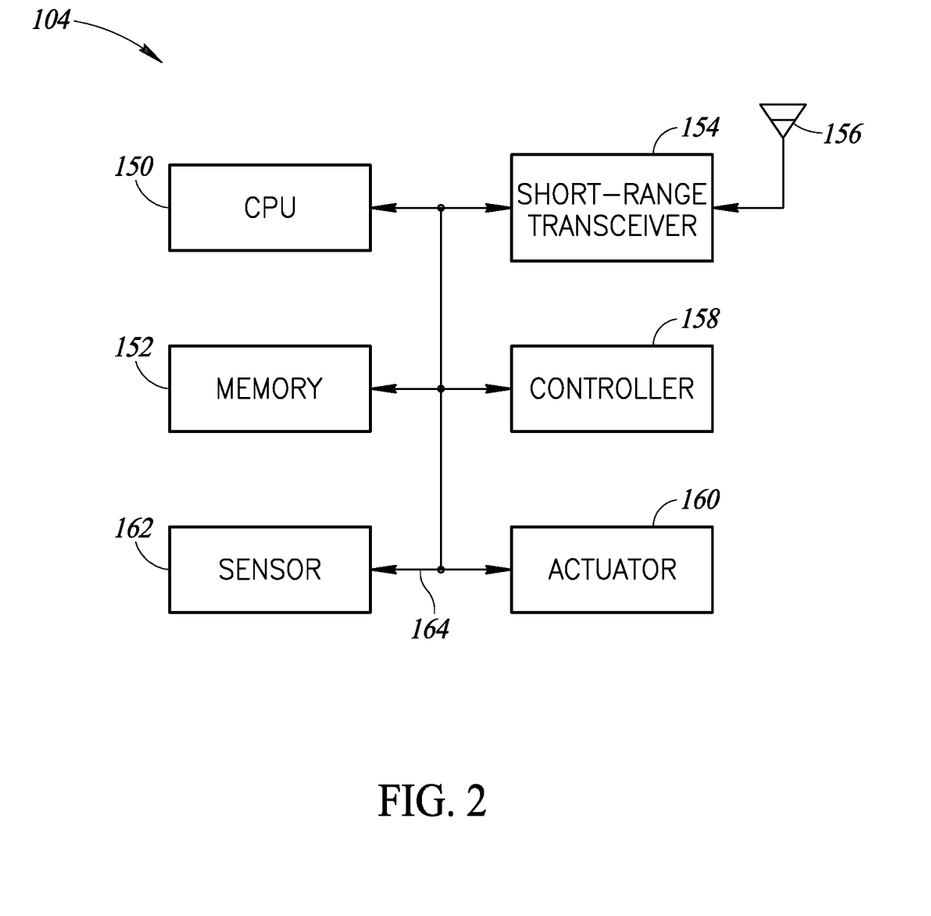
FIG. 2 is a functional block diagram of a network connected appliance used in the system architecture of FIG. 1.

FIG. 2 is a functional block diagram of an exemplary network appliance 104. The network appliance 104 includes a central processing unit (CPU) 150 and a memory 152. In general, the CPU 150 executes instructions using data and instructions stored in the memory 152. The CPU 150 may be implemented as a conventional processor, microcontroller, application specific integrated circuit (ASIC), or the like. Similarly, the memory 152 may include random access memory, read-only memory, flash memory, and the like. Those skilled in the art will appreciate that the CPU 150 and memory 152 may be integrated into a single device. The network appliance 104 is not limited by the specific hardware used to implement the CPU 150 and memory 152.

The network appliance 104 also includes a short-range transceiver 154 and antenna 156. As discussed above, the short-range transceiver 154 may be implemented as a WiFi transceiver or other suitable short-range transceiver. The short-range transceiver 154 is used to communicate with the hub or hubs 102.

The network appliance 104 also includes a controller 158 that controls operation of the network appliance. The controller 158 may typically be implemented as a series of instructions stored in the memory 152 and executed by the CPU 150. However, the controller 158 is illustrated as a separate block in FIG. 2 because it performs a separate function.

FIG. 2 also illustrates an actuator 160 and a sensor 162. The actuator 160 activates or controls a device while the sensor 162 provides a sensor measurement or status information of a device. Those skilled in the art will appreciate that FIG. 2 illustrates a generic network appliance 104 that may perform one or more functions. Some network appliances 104 may include one or both of the actuator 160 and sensor 162. For example, a thermostat in a home may include a sensor 162 to read the temperature and provide temperature data to the user and display temperature data on the UE 132 (see FIG. 1) and include the actuator 160 to control the temperature in response to commands from the user. Similarly, a security camera may include a sensor 162 in the form of a video camera element while the actuator 160 may be a motorized element to allow directional control or focusing of the camera. Other network appliances 104 may include only one of the actuator 160 or sensor 162. For example, a smoke detector may only include the sensor 162 while light controller may only include the actuator 160. Those skilled in the art will appreciate that the network appliance 104 may include multiple actuators 160 and/or multiple sensors 162.

Furthermore, the network appliance 104 may include a wireless communication device, such as WiFi, Bluetooth, or the like, to permit the actuator 160 and/or sensor 162 to be wirelessly controlled via wireless commands from the network appliance 104. For example, a network appliance 104 may be positioned in a room and control all the lighting in the room. Each light may be controlled by a respective actuator 160. In turn, each actuator 160 is controlled by the single network appliance 104 in the room via respective wireless links between the network appliance 104 and the actuators 160.

The various components in the network appliance 104 are coupled together via a bus system 164. The bus system 164 may include an address bus, data bus, control bus, power bus, and the like. However, these various buses are illustrated FIG. 2 as the bus system 164.

The network appliance 104 uses conventional power sources (not shown). For example, the network appliance 104 may be battery powered, or may be plugged in to a wall outlet. Alternatively, the network appliance 104 may be powered by a low voltage power distribution system, which may be convenient in an enterprise implementation. These conventional forms of power supplies are within the knowledge of one skilled in the art.

Figure 3:
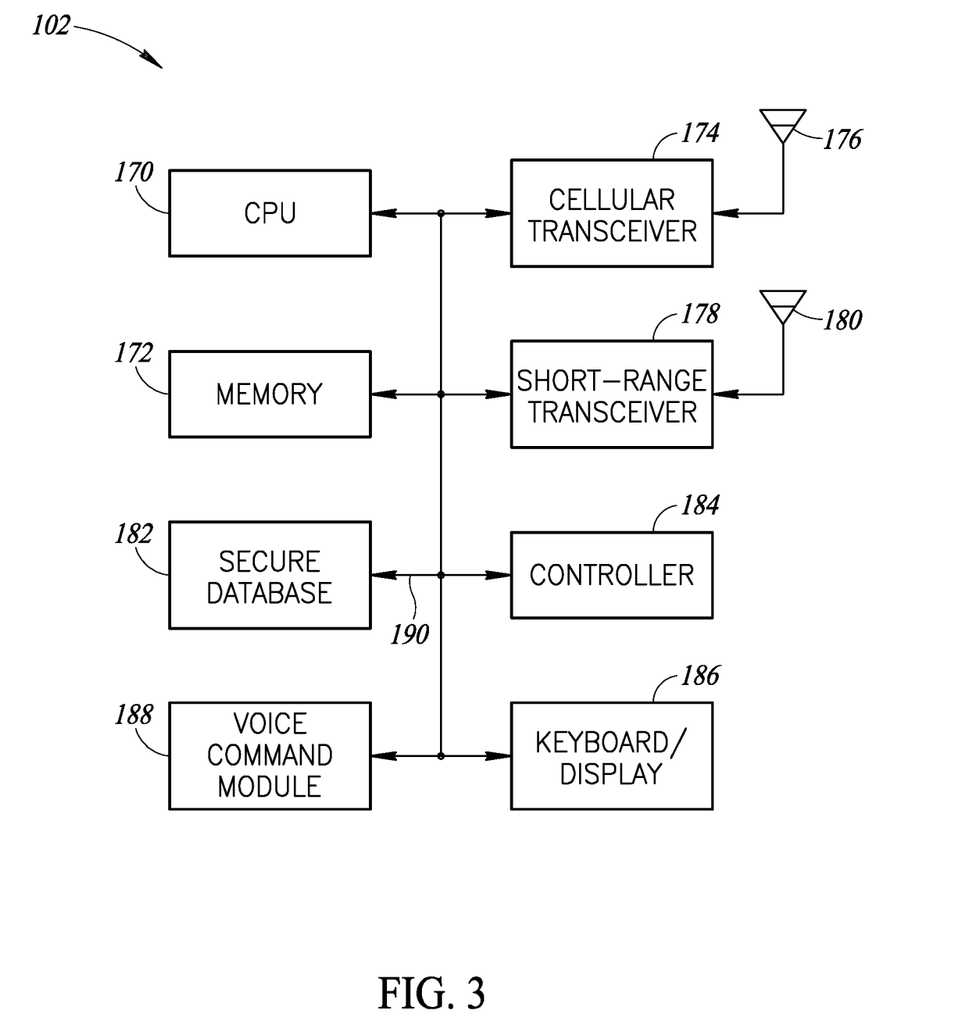
FIG. 3 is a functional block diagram of the secure hub used in the system architecture of FIG. 1.

FIG. 3 is a functional block diagram of an exemplary embodiment of the hub 102. The hub 102 includes a CPU 170 and memory 172. In general, the CPU 170 executes instructions using data and instructions stored in the memory 172. The CPU 170 may be implemented as a conventional microprocessor, microcontroller, ASIC, or the like. The memory 172 may include random access memory, read-only memory, flash memory, and the like. As discussed above with respect to the network appliance 104, the CPU 170 and memory 172 may be integrated into a single device. The hub 102 is not limited by the specific hardware used to implement the CPU 170 and memory 172.

The hub 102 also includes a 5G compatible cellular transceiver 174 and an associated antenna 176. Those skilled in the art will appreciate that the specific form of the cellular transceiver 174 can depend on the particular cellular network operator.

The hub 102 also includes a short-range transceiver 178 and associated antenna 180. The cellular antenna 176 and short-range antenna 180 may be implemented as a single antenna. As discussed above, the short-range transceiver 178 may be implemented as a WiFi transceiver or other suitable form of short-range communication. Although not illustrated in FIG. 3, the hub 102 can include a LAN/WLAN interface to permit communication with other hubs, as described above.

The hub 102 also includes a secure database 182. As discussed above, in various implementations, the secure database 182 may be a portion of the secure database 124 (see FIG. 1) and contain information for all appliances controlled by the hub 102, The information stored in the secure database 182 may be encrypted using AES-256 encryption or other suitable form of encryption. In addition, as will be described in greater detail below, the secure database 182 may be implemented as a portion of the Blockchain stored locally within the hub 102. Alternatively, the Blockchain secure database may be stored centrally or in a distributed fashion in an enterprise implementation. In yet another implementation, the Blockchain data storage may be distributed over a wide number of machines using, by way of example, a cloud computing network. Details of the Blockchain storage are provided below.

The hub 102 also includes a controller 184 that controls operation of the hub 102. Those skilled in the art will appreciate that the controller 184 may be typically implemented as a series of instructions stored in the memory 172 and executed by the CPU 170. Nonetheless, the controller 184 is illustrated in the functional block diagram of FIG. 3 as a separate block because it performs a separate function. The controller 184 may control access to the secure database 182, and further control operation of the cellular transceiver 174 and short-range transceiver 178. The controller 184 is responsible for authentication of a user as well as the generation of commands to be transmitted to network appliances 104 via the short-range transceiver 178 and to receive data (e.g., sensor data) from network appliances. The controller 184 may also control access to the cellular transceiver 174 and thereby control access to the WAN 120 (see FIG. 1). As noted above, the network appliances 104 cannot access the Internet and are thus protected from typical attacks that IoT devices currently experience.

The hub 102 can also include a keyboard/display 186. Although a keyboard and display may be implemented separately, in an exemplary embodiment, the display is a touch-sensitive display that can be used to implement a keyboard as well. The keyboard/display 186 can be used to generate commands for the network appliances 104 in the manner described above. The display can be used to list network appliances 104 and allow a user to select commands for the network appliances. As previously noted, the application software program executing on the UE 132 or on the hub 102 can also be used to control the network appliances 104. Commands from the UE 132 are transmitted to the hub 102 in the manner described above.

Because the hub 102 can be integrated into a set top box, the keyboard/display 186 can be implemented using a conventional television as the display and a remote control or on-screen keyboard to thereby provide the functionality of the keyboard/display 186.

The set top box hub 102 also includes a voice command module 188 responsive to user voice commands. The audio input to the voice command module 188 can be provided by a television remote control or by a smart speaker device, such as Alexa™ Google Home™, or the like. The smart speaker can be integrated into the set top hub 102. The user can provide voice commands, such as "turn on a light" or set of lights, adjust temperature, or the like. The voice command module 188 detects and interprets voice commands from the user and converts the voice command(s) into one or more commands from the hub 102 to a selected one or more appliances 104 for execution.

The various components in the hub 102 are coupled together via a bus system 190. The bus system 190 may include an address bus, data bus, control bus, power bus, and the like. However, these various buses are illustrated in FIG. 3 as the bus system 190.

As with the implementation illustrated in FIG. 1, all communications between the hubs 102, the network appliances 104, and the UEs 132 can be encrypted using, by way of example, HTTPS. In addition, the master hub 102 can generate the encrypted SSL certificate for each appliance, as described above with respect to FIG. 2. Furthermore, the IEEE 802.11 standard includes provisions for WiFi Protected Access 2 (WPA 2) protection for additional security in communications between the hub 102 and the network appliances 104. An improved version of WiFi protection (WPA 3) is expected to replace WPA 2 in the near future and can be incorporated into the system 100.

The hub 102 also may include signal boosting capability for both cellular transceiver 174 and the short-range transceiver 178. If the facility is located in an area with weak cellular coverage, the hub 102 may increase the amplification of the signals received from the base station 112 (see FIG. 1) and boost transmit power to more effectively transmit data to the base station. The controller 184 may be configured to measure signal strength of received signals, such as a Received Signal Strength Indicator (RSSI), to determine whether amplification and increased transmit power are necessary. In fringe areas of cellular coverage, this technique may improve overall operation of the system 100. When operating as a picocell, the hub 102 can effectively operate as a base station in the manner similar to the base station 112. However, unlike the base station 112, which uses the backhaul 114 to communicate with the core network 116, the hub 102 communicates wirelessly with the base station 112. However, the hub 102 may broadcast its own channel to thereby effectively function as a base station. Based on the type of cellular system, the channel may include, by way of example, a pilot signal or other cellular identifier. In a installation with multiple hubs 102, as described above, the hubs may communicate with each other using 5G communication links between the individual hubs.

Similarly, the hub 102 may provide greater range for the short-range transceiver 178. In this aspect, the controller 184 can measure signal strength of signals received from any of the network appliances 104 or the UE 132 to determine whether the system 100 would benefit from increased amplification of received signals and increased transmit power in the short-range transceiver 178. If necessary, the controller 184 can boost the amplification on the receive portion of the short-range transceiver 178 and increase the transmit power on the transmit side of the short-range transceiver. With this dynamic capability, the hub 102 can effectively increase both cellular and short-range wireless coverage, capacity, performance, and efficiency. The intelligent control provided by the controller 184 measures signal strength and boosts signals as necessary.

Access to the hub 102 by the UE 132 is strictly controlled. As previously described, a software application program is located on both the hub 102 and the UE 132. The software application controls the network appliances 104 locally via the hub 102, as described above. For an initial setup, a special access code is generated randomly by the hub 102 to identify and authenticate the UE 132. Subsequent operation and device management are executed by the software application program on the hub 102 and the UE 132.

Figure 4A:
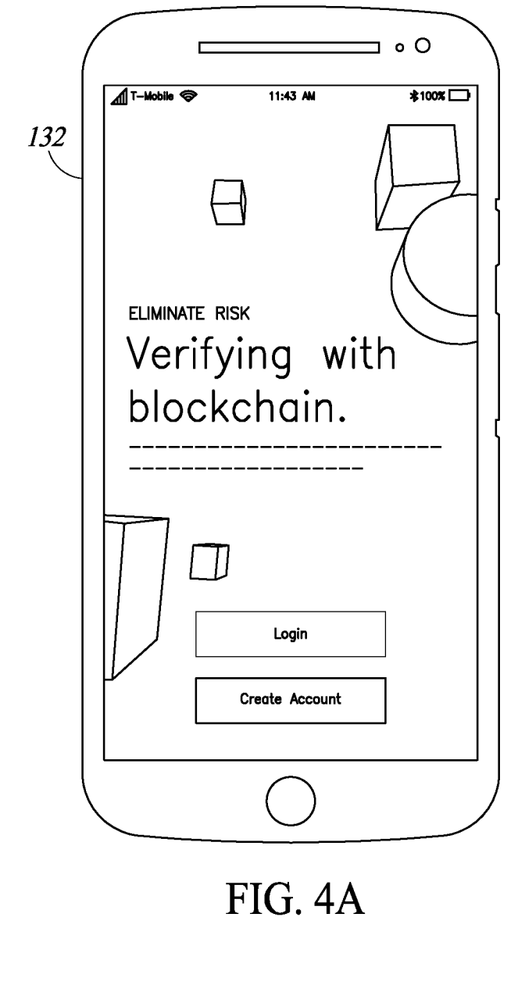
FIGS. 4A-4B illustrate screen shots of a log in procedure using devices in accordance with the present disclosure.

Subsequent authentication of the UE 132 utilizes a two-step authentication procedure. FIG. 4A illustrates a screen display of the UE 132 with a login selection. The user provides a user name and password as part of the login procedure. Upon receipt of the user name and password, the hub 102 may send a verification passcode to the UE 132 that must be entered within a predetermined period of time. If a user forgets the password, they will have to start all over again and re-register the hub 102 and all network appliance 104.

Figure 4B:
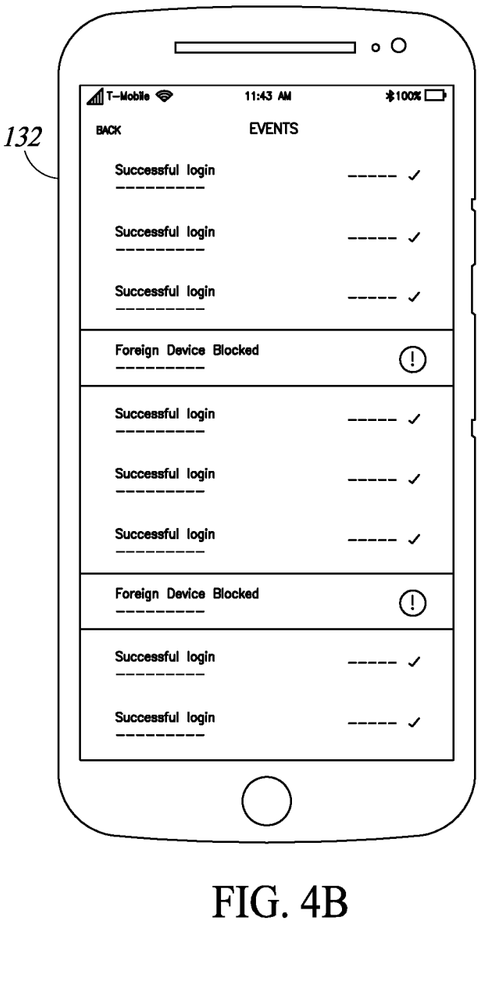

The hub 102 logs all login attempts, whether they are successful or unsuccessful. FIG. 4B illustrates a display of the UE 132 listing a series of events, including successful logins and login attempts that were blocked.

As noted above, the system 100 uses a two-factor authentication technique. When the system 100 is initially set up, the user must manually register the UE 132 and each of the plurality of network appliances 104 with the hub 102. The data entries associated with the UE 132 and each network appliance 104 are encrypted and stored in the secure database 182 (see FIG. 3) within the hub 102. As previously described, the hub 102 periodically communicates with the secure database 124 (see FIG. 7) as part of the Blockchain stored on one or more servers 170 in the Cloud 172. This maintains synchronization between the hub 102 and the Blockchain on the Cloud 172.

Figure 5:
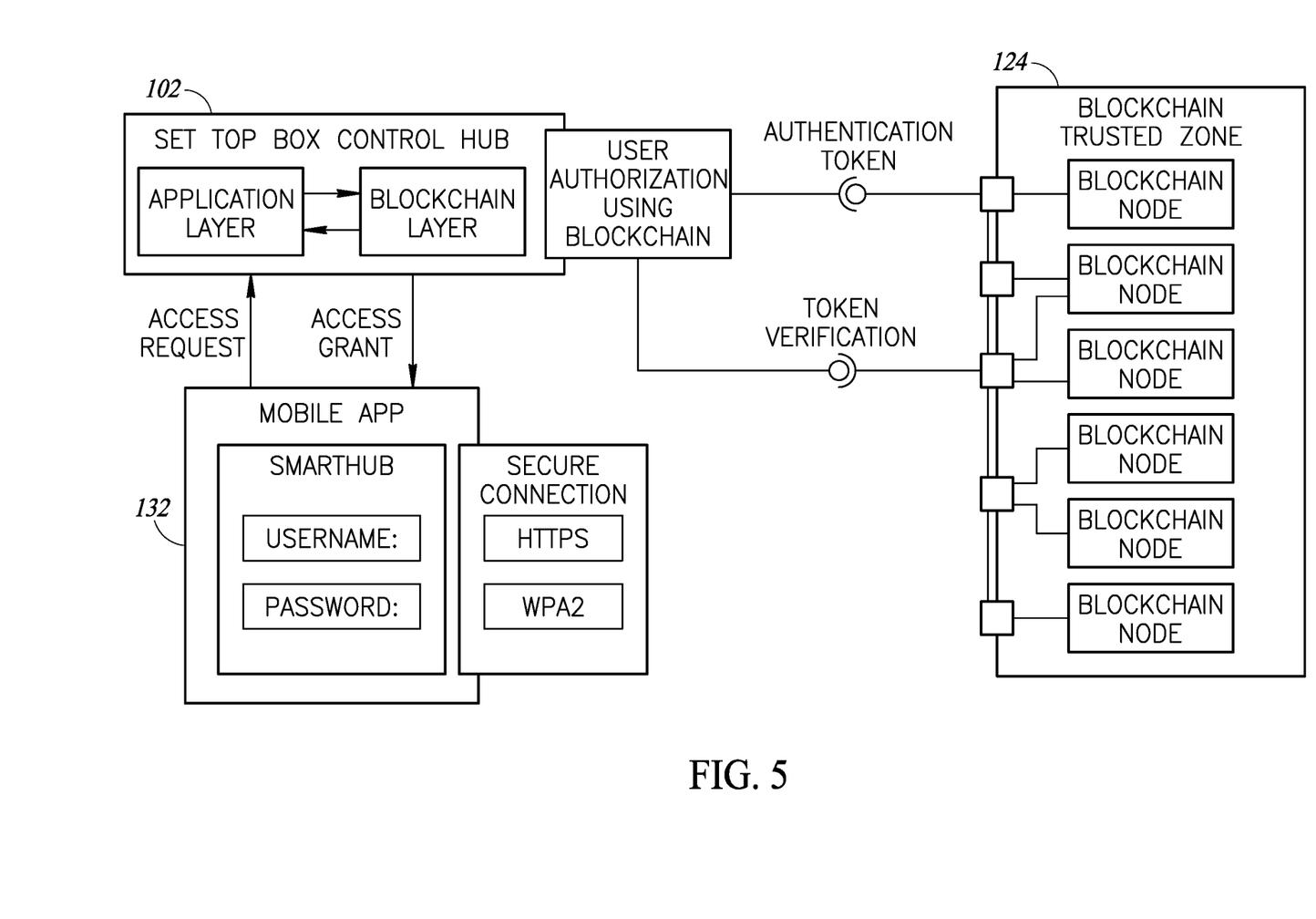
FIG. 5 illustrates a two-step authentication procedure.

Once the initial installation is complete, the system permits the addition of new users or network appliances. The addition of a new UE 132 is illustrated in FIG. 5. In step 1 of FIG. 5, the unauthenticated UE requests access. In step 2, the hub 102 generates an authentication token (e.g., a device password and/or identification code) for transmission to the secure database 124, implemented as a Blockchain in the example of FIG. 5. The hub 102 also sends a notification message to all previously authenticated UEs 132 to provide notification and to request approval for the addition of a new UE. If approved by all previously authenticated UEs 132, the Blockchain generates a token verification in step 3 and, if all tokens are authentic, the hub 102 grants access to the new UE in step 4. The secure database 182 (see FIG. 3) and the secure database 182 (see FIG. 7) are updated to create a new data entry for the newly authenticated UE.

In subsequent authentications, when the UE 132 comes within range of the hub 102, the hub will recognize the UE because its data is already present in the database 182. This is the first authentication factor. In the second authentication factor, the hub 102 sends a verification message to the UE 132. This may be in the form of a passcode that the user must enter within a predetermined time-out period of some other known authentication step, such as voice recognition, shared secret in which a user modifies an image displayed on the UE 132 in a manner known only to the user and the database 182.

Similarly, new network appliances 104 may be added to the system. In one embodiment, the UE can manually add a network appliance 104 by clicking an "Add Device" command in the software application program. Alternatively, the hub 102 automatically detects the presence of a new unauthenticated network appliance and initiates an authentication process. As discussed above, the hub 102 sends a notification message to previously authenticated UEs 132 to request authorization to add the new network appliance. If authenticated, the system 100 adds the new network appliance 104 using the token verification process described with respect to UE authentication in FIG. 5. Those skilled in the art will appreciate that, with a large number of authenticated UEs, such as may be present in an enterprise implementation, it may be undesirable to require approval of all authenticate UEs to add a new UE or a new appliance. Accordingly, the system can provide for the designation of a portion of the authenticated UEs 132 to serve as controls for authentication purposes. As part of an auto-authentication process, if the new network appliance is designated as a certified ioXt compliant device, the hub 102 can eliminate the UE notification process described above and authenticate the new network appliance without human intervention. As described above, the system 100 creates a data entry in the database 182 (see FIG. 3) or the database 124 (see FIG. 7) for all newly authenticated UEs or network appliances.

If an unauthorized individual (i.e., an intruder) downloads the software application and attempts to gain access to the system 100, the hub 102 will ask for authentication information such as described above (e.g., user name and password, voice recognition, shared secret, and the like). Because the intruder UE is unauthenticated, the notification message to authenticated UEs 132 will permit any of the users to deny access.

If the user name and password are compromised, the hub 102 will use an additional security layer provided by Blockchain, as illustrated in FIG. 5. The intruder UE will not be present in any authentication database and will be blocked from access to the system 100.

Figure 7:
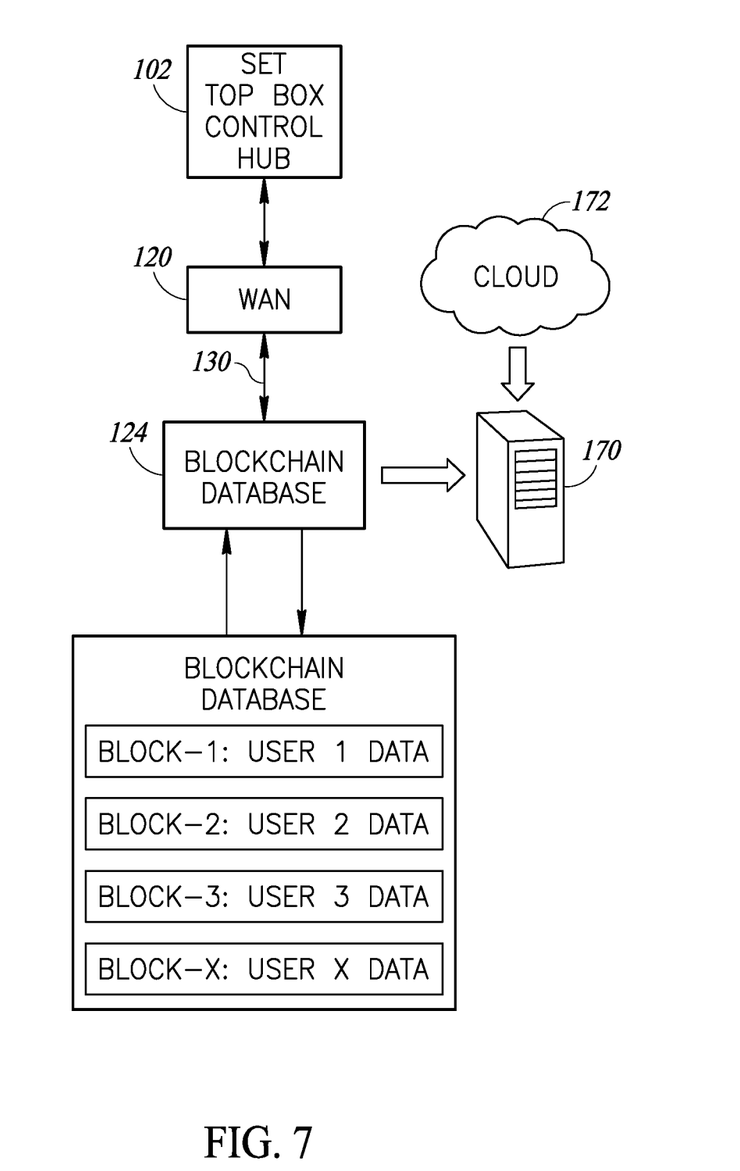
FIG. 7 illustrates a Blockchain implementation of a secure database.

The system 100 can automatically detect the installation of new components, such as the hub 102, or a new network appliance 104, in the manner described above. If the hub 102 is replaced, a new hub resynchronization process through the master Blockchain database is implemented for the user. FIG. 7 illustrates an exemplary architecture of the Blockchain database. As noted above, the hub 102 communicates with the WAN 120 via the cellular network operator, using the communication link 110 (see FIG. 1), the base station 112, the core network 116, and the gateway 118. FIG. 7 illustrates the communication link 130 between the WAN 120 and the secure database 124. As illustrated in FIG. 7, the Blockchain database includes a separate block for each user and contains all data associated with that user. As previously discussed, that information can include a list of one or more hubs 102 that the user may access as well as a list of all network appliances 104 that may be accessed by a particular user. As illustrated in FIG. 7, each block contains the data associated with each user. In this embodiment, the secure database 124 may be implemented and distributed over one or more servers 170 that may be part of a cloud computing environment 172. As those skilled in the art will appreciate, a Blockchain database is typically distributed over a large number of servers 170 that each contain an identical copy of the encrypted database.

The UE 132 can access the centralized secure database 124 through a licensed network, such as a cellular network embodied by the base station 112, core network 116, and gateway 118, as described above with respect to the hub 102. Alternatively, the UE 132 may access the Blockchain version of the secure database 124 using unlicensed network, such a WiFi connection to the WAN 120.

The hub 102 can discover new compatible network appliances 104 through a network scan. The hub 102 stores encrypted device information in the local secure database 182 (see FIG. 3) for security and authentication. As described above, the authentication process can be manually controlled by requiring the approval of any new components to the system 100 by the authenticated UEs 132 or automatically completed without human intervention if the new device is certified as ioXt compliant. The hub 102 initiates a pairing process with the new network appliance 104 once authentication and Blockchain based verification processes have been completed. The encrypted secure database 182 in the hub 102 is periodically shared with the remote Blockchain in the secure database 124 (see FIG. 7) so that the Blockchain database stored on the servers 170 have a complete and accurate list of all network appliances 104 coupled to each hub 102.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system comprising:
   a set top box control hub;
   a cellular transceiver within the set top box control hub configured for communication with a cellular communication network;
   a short-range transceiver within the set top box control hub configured for communication with other than the cellular communication network, the set top box control hub having a coverage range defined by a range of the set top box control hub short-range transceiver;
   a processor within the set top box control hub to control operations of the control hub;
   an audio input device within the set top box control hub to detect a user voice command;

a voice command module within the set top box control hub and coupled to the audio input device to detect the user voice command and to generate a user command therefrom;

a plurality of network appliances distributed throughout a facility, each of the plurality of network appliances having a short-range transceiver for communication with the set top box control hub; and a data storage area configured to store secure data related to the plurality of network appliances controlled by the set top box control hub;

wherein the set top box control hub processor uses the user command from the voice command module and the stored secure data to generate a command message directed to a selected one of the plurality of network appliances and to control the set top box control hub short-range transceiver to transmit the command message;

wherein each of the plurality of network appliances are configured to receive the command message from the set top box control hub via the short-range transceiver in each of the plurality of network appliances, but only the selected one of the plurality of network appliances to which the command message is directed can read the command message and process the command message; and wherein all communication with a wide area network (WAN) occurs via the cellular transceiver so that none of the plurality of network appliances can communicate directly with the WAN.

2. The system of claim 1 wherein the set top box control hub is further configured to encrypt the command message and only the selected one of the plurality of network appliances to which the command message is directed can read the encrypted command message and process the encrypted command message to thereby decrypt the command message and process the command message.

3. The system of claim 1 wherein the audio input is a portion of a remote control for the set top box control hub.

4. The system of claim 1 wherein the audio input is a portion of a smart speaker coupled to the set top box control hub.

5. The system of claim 1 wherein one of the plurality of network appliances is a security device.

6. The system of claim 5 wherein the security device has security settings and the command message directed to the security device controls the security settings.

7. The system of claim 1 wherein the coverage range of the set top box control hub short-range transceiver does not extend throughout the facility, the system further comprising:

a second control hub having a short-range transceiver with a coverage range within the coverage range of the set top box control hub short-range transceiver to permit radio communication between the set top box control hub and the second control hub; and a processor within the second control hub to control operations of the second control hub;

wherein the second control hub processor is configured to receive the command message transmitted from the set top box control hub short-range transceiver and to retransmit the received command message using the second control hub short-range transceiver; and wherein only the selected one of the plurality of network appliances to which the command message is directed can decrypt the command message and process the decrypted command message.

8. The system of claim 7, further comprising a cellular transceiver within the second control hub configured for communication with the cellular communication network, wherein the second control hub can communicate directly with the cellular network independently of the set top box control hub.

9. The system of claim 7 wherein the second control hub is configured for communication with the cellular communication network only via the set top box control hub cellular transceiver.

10. The system of claim 7 wherein the set top box control hub communicates with the second control hub using the short-range transceiver.

11. The system of claim 7 wherein the set top box control hub communicates with the second control hub using the cellular transceiver.

12. The system of claim 1 wherein the data storage area is locally implemented within a storage area of the set top box control hub.

13. The system of claim 1 wherein the data storage area is remotely implemented within a storage area remote from the set top box control hub.

14. The system of claim 1 wherein the data storage area is implemented as a Blockchain data storage.

15. A method comprising:

storing secure data related to a plurality of network appliances distributed throughout a facility and controlled by a set top box control hub;

an audio input device detecting a voice input from a user;

a voice command module within a set top box control hub receiving the voice input from the audio input device and generating a user command therefrom;

using the user command from the voice command module and the stored secure data to generate a command message directed to a selected one of the plurality of network appliances;

a short-range transceiver within the set top box control hub transmitting the command message to the plurality of network appliances, the set top box control hub short-ranger transceiver having a coverage range;

each of the plurality of network appliances receiving the command message from the set top box control hub short-range transceiver via respective short-range transceivers in each of the plurality of network appliances; and only the selected one of the plurality of network appliances to which the command message is directed is reading the command message and processing the command message;

wherein none of the plurality of network appliances can communicate directly with a wide area network (WAN).

16. The method of claim 15 wherein the set top box control hub includes a cellular transceiver, the method further comprising the plurality of network appliances accessing the WAN only through the cellular transceiver.

17. The method of claim 15, further comprising the set top box control hub encrypting the command message prior to transmission and the selected one of the plurality of network appliances to which the command message is directed decrypting the encrypted command message and processing the decrypted command message.

18. The method of claim 15 wherein the audio input is a portion of a remote control for the set top box control hub.

19. The method of claim 15 wherein the audio input is a portion of a smart speaker coupled to the control hub.

20. The method of claim 15 wherein the coverage range of the set top box control hub short-range transceiver does not extend throughout the facility, the method further comprising:
- using a second control hub having a short-range transceiver with a coverage range within the coverage range of the set top box control hub short-range transceiver to permit radio communication between the set top box control hub and the second control hub;
- the short-range transceiver within the set top box control hub transmitting the command message to the short-range transceiver within the second control hub; and
- the short-range transceiver within the second control hub retransmitting the received command message using the second control hub short-range transceiver.

21. The method of claim 20 wherein the second control hub includes a cellular transceiver for communication with a cellular communication network, the second control hub communicating directly with the cellular network independently of the set top box control hub.

22. The method of claim 20 wherein the set top box control hub includes a cellular transceiver for communication with a cellular communication network, the second control hub communicating with the cellular network only using the set top box control hub cellular transceiver.

23. The method of claim 20 wherein the set top box control hub communicates with the second control hub using the short-range transceiver.

24. The method of claim 20 wherein the set top box control hub includes a cellular transceiver and the second control hub includes a cellular transceiver, the method further comprising the set top box control hub communicating with the second control hub using the cellular transceivers in the set top box control hub and the second set top box control hub.

* * * * *